United States Patent
Sano

(10) Patent No.: US 9,477,304 B2
(45) Date of Patent: Oct. 25, 2016

(54) INFORMATION PROCESSING APPARATUS, INFORMATION PROCESSING METHOD, AND PROGRAM

(75) Inventor: Akane Sano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 816 days.

(21) Appl. No.: 13/116,848

(22) Filed: May 26, 2011

(65) Prior Publication Data

US 2011/0301956 A1    Dec. 8, 2011

(30) Foreign Application Priority Data

Jun. 2, 2010  (JP) ................. P2010-127110

(51) Int. Cl.
*G06F 3/16* (2006.01)
*G10L 15/26* (2006.01)
*G06K 9/00* (2006.01)
*G06F 3/01* (2006.01)

(52) U.S. Cl.
CPC ................. *G06F 3/012* (2013.01); *G06F 3/16* (2013.01); *G10L 15/26* (2013.01); *G06K 9/00221* (2013.01)

(58) Field of Classification Search
CPC ... G10L 15/22; G10L 15/222; G10L 15/265; G10L 15/32; G06K 9/00221; G06K 9/00335; G06F 3/011; G06F 21/32; G06F 3/012; G06F 3/013

USPC ............................................... 704/270, 270.1
See application file for complete search history.

(56) References Cited

U.S. PATENT DOCUMENTS

| | | | |
|---|---|---|---|
| 6,262,730 B1 * | 7/2001 | Horvitz et al. ............... | 715/707 |
| 6,397,180 B1 * | 5/2002 | Jaramillo ................ | G10L 15/10 |
| | | | 704/251 |
| 6,637,883 B1 * | 10/2003 | Tengshe et al. .............. | 351/210 |
| 6,988,072 B2 | 1/2006 | Horvitz | |
| 7,006,881 B1 * | 2/2006 | Hoffberg et al. ............... | 700/83 |
| 7,013,297 B2 * | 3/2006 | Miksovsky ..................... | 706/60 |
| 7,429,108 B2 * | 9/2008 | Rosenberg .................... | 351/209 |
| 7,438,414 B2 * | 10/2008 | Rosenberg .................... | 351/210 |
| 8,095,490 B2 * | 1/2012 | Nishizaki et al. ............. | 706/46 |
| 8,494,507 B1 * | 7/2013 | Tedesco et al. .............. | 455/418 |

(Continued)

*Primary Examiner* — Matthew Baker
(74) *Attorney, Agent, or Firm* — Chip Law Group

(57) ABSTRACT

An information processing apparatus includes an image analysis unit that executes a process for analyzing an image captured by a camera, a speech analysis unit that executes a process for analyzing speech input from a microphone, and a data processing unit that receives a result of the analysis conducted by the image analysis unit and a result of the analysis conducted by the speech analysis unit and that executes output control of help information for a user. The data processing unit calculates a degree of difficulty of the user on the basis of at least either the result of the image analysis or the result of the speech analysis and, if the degree of difficulty that has been calculated is equal to or more than a predetermined threshold value, executes a process for outputting help information to the user.

13 Claims, 10 Drawing Sheets

(56) References Cited

U.S. PATENT DOCUMENTS

| | | | | |
|---|---|---|---|---|
| 8,701,003 | B2* | 4/2014 | Kondziela | G06F 3/011 715/707 |
| 8,725,505 | B2* | 5/2014 | Mowatt | G10L 15/22 704/231 |
| 8,914,290 | B2* | 12/2014 | Hendrickson | G10L 13/02 704/201 |
| 2001/0047265 | A1* | 11/2001 | Sepe, Jr. | G10L 15/22 704/275 |
| 2005/0183032 | A1* | 8/2005 | Bushey | G10L 15/22 715/809 |
| 2005/0251746 | A1* | 11/2005 | Basson et al. | 715/708 |
| 2006/0192775 | A1* | 8/2006 | Nicholson et al. | 345/211 |
| 2006/0256083 | A1* | 11/2006 | Rosenberg | 345/156 |
| 2008/0103781 | A1* | 5/2008 | Wasson | G10L 17/26 704/277 |
| 2008/0276186 | A1* | 11/2008 | Feduszczak et al. | 715/762 |
| 2009/0295832 | A1* | 12/2009 | Takatsuka et al. | 345/659 |
| 2010/0007726 | A1* | 1/2010 | Barbieri et al. | 348/78 |
| 2010/0125456 | A1* | 5/2010 | Weng | G10L 15/22 704/251 |
| 2011/0109539 | A1* | 5/2011 | Wu et al. | 345/156 |
| 2011/0173000 | A1* | 7/2011 | Yamamoto | G10L 15/1815 704/240 |

* cited by examiner

FIG. 8

| | t-1 | | | | | | t | | | | | |
|---|---|---|---|---|---|---|---|---|---|---|---|---|
| | DIRECTION OF FACE (FaceDir) | DURATION OF DIRECTION OF FACE (FaceDirDur) | ERROR (Error) | USER LEVEL (User Level) | ELAPSED TIME (RT) | DIRECTION OF FACE (FaceDir) | DURATION OF DIRECTION OF FACE (FaceDirDur) | ERROR (Error) | USER LEVEL (User Level) | ELAPSED TIME (RT) | DEGREE OF DIFFICULTY (H) |
| U1 | 1 | 3 | 1 | 1 | 2 | 1 | 3 | 1 | 1 | 3 | 80 |
| U2 | 2 | 2 | 1 | 2 | 2 | 2 | 2 | 1 | 2 | 3 | 20 |
| U3 | 1 | 3 | 2 | 1 | 1 | 1 | 3 | 3 | 1 | 1 | 90 |

FIG. 9

| STATE TRANSITION | EXAMPLE OF CONFIGURATION OF RESPONSE DATA |
|---|---|
| DISPLAY OF RECOMMENDED PROGRAMS | PLEASE SELECT A PROGRAM YOU WANT WATCH FROM THE RECOMMENDED PROGRAMS, OR SEARCH FOR A PROGRAM USING SEARCH KEYWORDS |
| DISPLAY OF SPECIFIED CHANNEL OR DAY | YOU CAN REFINE YOUR SEARCH WITH TITLES OR GENRES SUCH AS DRAMA, SPORT, VARIETY, MUSIC, AND MOVIES |
| DISPLAY OF SPECIFIED GENRE | YOU CAN REFINE YOUR SEARCH WITH TITLES OR CHANNELS |
| ⋮ | ⋮ |
| ⋮ | ⋮ |
| ⋮ | ⋮ |

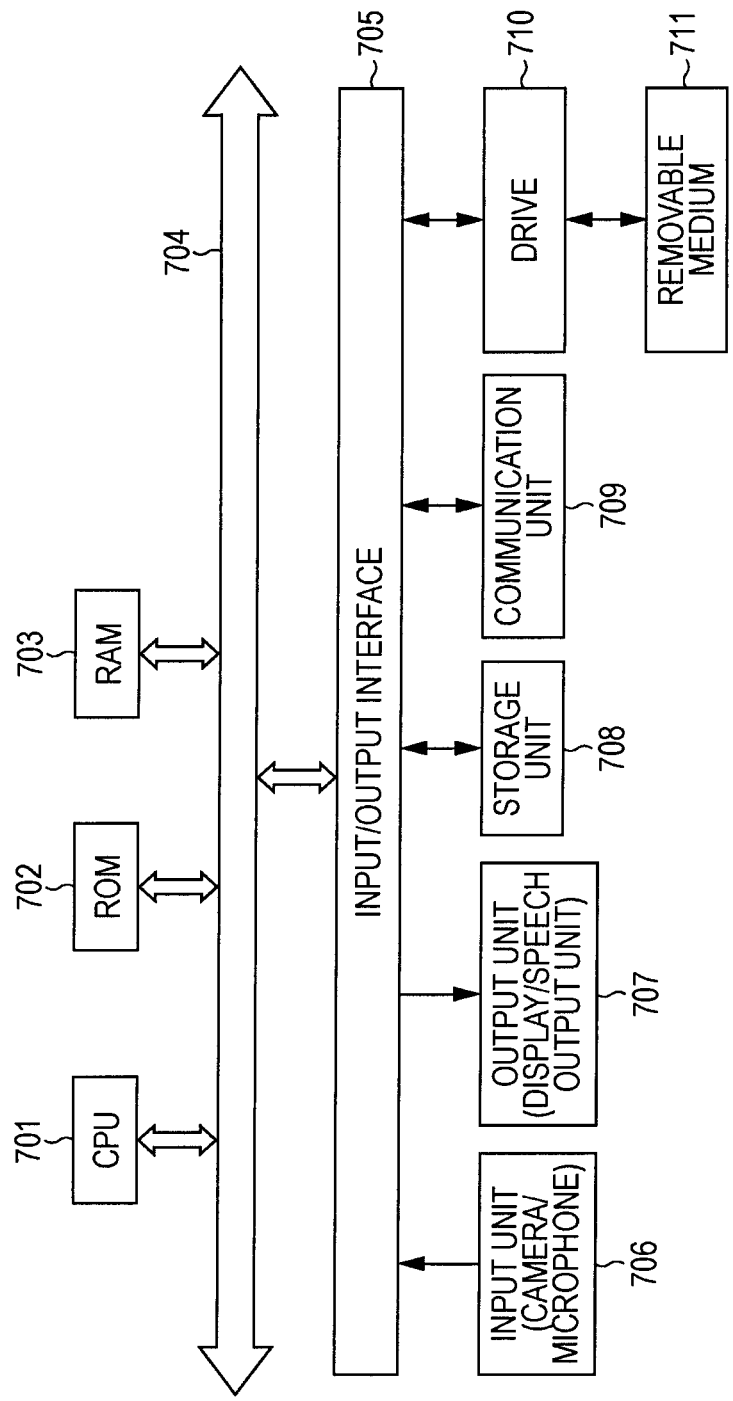

INFORMATION PROCESSING APPARATUS, INFORMATION PROCESSING METHOD, AND PROGRAM

BACKGROUND

The present disclosure relates to an information processing apparatus, an information processing method, and a program, and more particularly to an information processing apparatus, an information processing method, and a program that execute various processes on the basis of utterances of a user or the like.

When using a personal computer (PC), a television set, a recording/playback device, or other household electric appliances, a user operates an input unit provided for each apparatus or a remote control in order to cause the apparatus to execute a desired process. For example, when a PC is used, a keyboard and a mouse are typically used as input devices. In addition, in the case of a television set, a recording/playback device, or the like, a remote control is used to cause the apparatus to execute various processes such as, for example, switching of the channel and selection of a content to be played back.

Various studies have been conducted on a system in which a user can instruct various apparatuses by making utterances or through movements. More specifically, there are systems such as one in which an utterance of a user is recognized by using a speech recognition process and one in which an action or a gesture of a user is recognized by using an image recognition process.

An interface through which communication with a user is executed using a general input device such as a remote control, a keyboard, or a mouse as well as various communication modes such as speech recognition and image recognition is called a "multimodal interface". An example of the related art in which a multimodal interface is disclosed is U.S. Pat. No. 6,988,072.

However, a speech recognition apparatus and an image recognition apparatus used with a multimodal interface or the like are limited in terms of the processing capabilities thereof, and can only understand a limited number of types of utterances and movements of a user. Therefore, currently, there are many situations in which the intention of a user is not understood by the system exactly. In a system adopting speech recognition, in particular, although a user can experience natural interaction when the number of types of commands that he/she can speak is increased, the user may have difficulties sometimes with regard to what to speak next since it is difficult for him/her to know the available commands that can be received by the system.

SUMMARY

Therefore, it is desirable to provide, in a multimodal interactive system in which an information processing apparatus executes processes by receiving speech information and image information such as utterances and movements of a user, an information processing apparatus, an information processing method, and a program that can provide a user with optimal help information in accordance with, for example, the presence of the user, the direction of the face of the user, the state of the user, the state of the system, and the history of past responses.

An information processing apparatus according to a first embodiment of the present disclosure includes an image analysis unit that executes a process for analyzing an image captured by a camera, a speech analysis unit that executes a process for analyzing speech input from a microphone, and a data processing unit that receives a result of the analysis conducted by the image analysis unit and a result of the analysis conducted by the speech analysis unit and that executes output control of help information for a user. The data processing unit calculates a degree of difficulty of the user on the basis of at least either the result of the image analysis or the result of the speech analysis and, if the degree of difficulty that has been calculated is equal to or more than a predetermined threshold value, executes a process for outputting help information to the user.

Furthermore, in the information processing apparatus according to the first embodiment of the present disclosure, the data processing unit may judge whether or not a face of the user faces the information processing apparatus on the basis of the result of the image analysis and may calculate the degree of difficulty by using information regarding the judgment.

Furthermore, in the information processing apparatus according to the first embodiment of the present disclosure, the data processing unit may judge a duration over which a face of the user faces a particular direction on the basis of the result of the image analysis and may calculate the degree of difficulty by using information regarding the judgment.

Furthermore, in the information processing apparatus according to the first embodiment of the present disclosure, the data processing unit may calculate the degree of difficulty by using information regarding a judgment as to whether or not a process corresponding to a request made by the user has been executed.

Furthermore, in the information processing apparatus according to the first embodiment of the present disclosure, the data processing unit may judge a user level on the basis of information regarding the number of times that a request made by the user has been rejected and may calculate the degree of difficulty by using information regarding the judgment.

Furthermore, in the information processing apparatus according to the first embodiment of the present disclosure, the data processing unit may calculate the degree of difficulty on the basis of information regarding a time elapsed since the information processing apparatus executed a process for responding to the user.

Furthermore, the information processing apparatus according to the first embodiment of the present disclosure further may include a system state control unit that obtains and may store state transition of the information processing apparatus. The data processing unit may execute a process for outputting help information corresponding to a system state stored in the system state control unit.

Furthermore, an information processing method according to a second embodiment of the present disclosure that is used in an information processing apparatus includes executing, with an image analysis unit, a process for analyzing an image captured by a camera, executing, with a speech analysis unit, a process for analyzing speech input from a microphone, and receiving, with a data processing unit, a result of the analysis conducted by the image analysis unit and a result of the analysis conducted by the speech analysis unit and executing output control of help information for a user. In the receiving, a degree of difficulty of the user is calculated on the basis of at least either the result of the image analysis or the result of the speech analysis and, if the degree of difficulty that has been calculated is equal to or more than a predetermined threshold value, a process for outputting help information to the user is executed.

Furthermore, a program according to a third embodiment of the present disclosure that causes an information process to be executed in an information processing apparatus includes causing an image analysis unit to execute a process for analyzing an image captured by a camera, causing a speech analysis unit to execute a process for analyzing speech input from a microphone, and causing a data processing unit to receive a result of the analysis conducted by the image analysis unit and a result of the analysis conducted by the speech analysis unit and to execute output control of help information to a user. In the causing of the data processing unit to receive the result, a degree of difficulty of the user is calculated on the basis of at least either the result of the image analysis or the result of the speech analysis and, if the degree of difficulty that has been calculated is equal to or more than a predetermined threshold value, a process for outputting help information to the user is executed.

It is to be noted that the program according to the third embodiment of the present disclosure is, for example, a program that can be provided, from a storage medium or a communication medium that provides the program as a computer-readable program, to an information processing apparatus or a computer system capable of executing various program codes. By providing the program as a computer-readable program, a process corresponding to the program can be realized on an information processing apparatus or a computer system.

Other characteristics and advantages of the present technology will be clarified through detailed description based on embodiments of the present disclosure and the accompanying drawings, which will be referred to later. It is to be understood that a "system" herein refers to a logical configuration including a set of a plurality of apparatuses, and therefore is not limited to one in which the apparatuses having respective configurations are provided in the same case.

In a configuration according to an embodiment of the present disclosure, an apparatus and a method are realized that analyze the state of a user, judge the degree of difficulty of the user, and provide help information in accordance with the result of the judgment. More specifically, a data processing unit receives the result of an analysis conducted by an image analysis unit that executes a process for analyzing an image captured by a camera and the result of an analysis conducted by a speech analysis unit that executes a process for analyzing speech input from a microphone, and executes output control of help information for the user. The data processing unit obtains, for example, user information such as whether or not the face of the user faces the apparatus as the result of the image analysis, and calculates the degree of difficulty of the user on the basis of the obtained user information. If the calculated degree of difficulty is equal to or more than a predetermined threshold value, the data processing unit executes a process for outputting help information to the user.

BRIEF DESCRIPTION OF THE DRAWINGS

FIG. 8 is a diagram illustrating an example of processes executed by the information processing apparatus according to the embodiment of the present disclosure;

FIG. 9 is a diagram illustrating an example of processes executed by the information processing apparatus according to the embodiment of the present disclosure; and FIG. 10 is a diagram illustrating an example of the hardware configuration of the information processing apparatus according to the embodiment of the present disclosure.

DETAILED DESCRIPTION OF EMBODIMENTS

Figure 1:
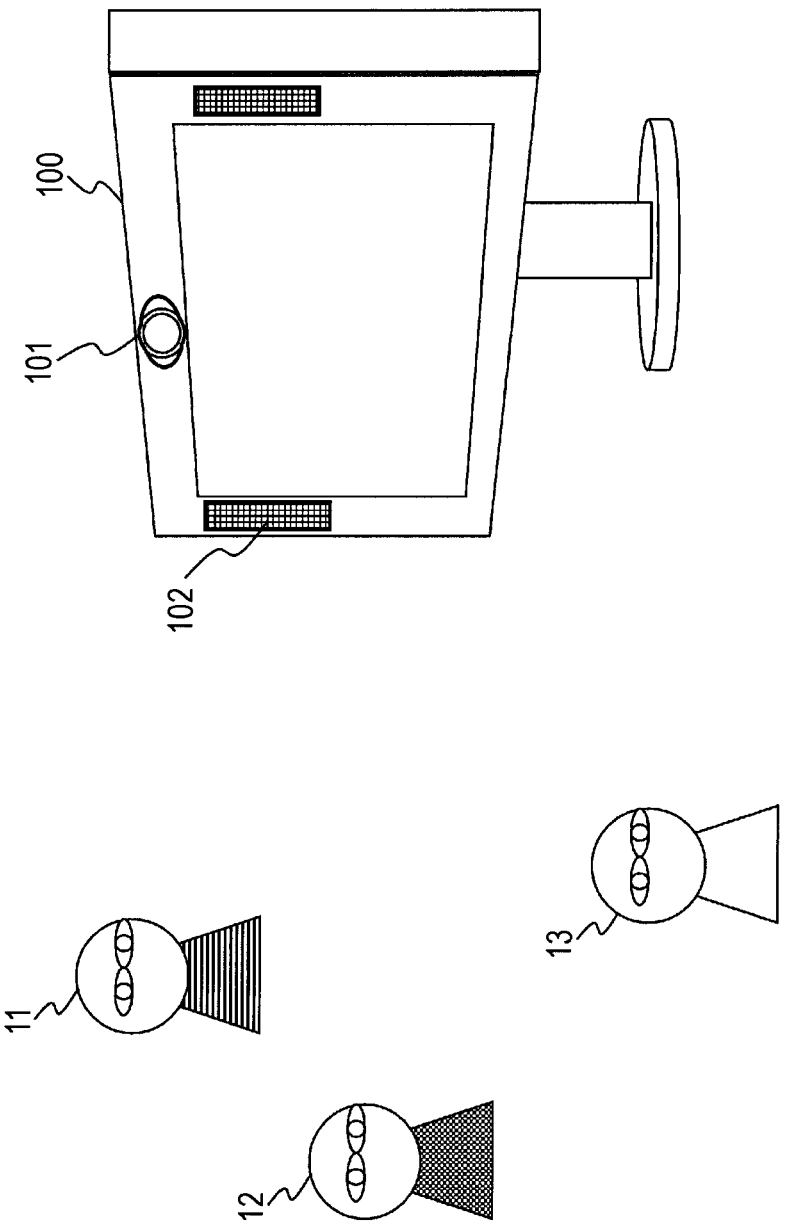
FIG. 1 is a diagram illustrating an example of use of an information processing apparatus according to an embodiment of the present disclosure.

Details of an information processing apparatus, an information processing method, and a program according to an embodiment of the present disclosure will be described hereinafter with reference to the drawings. It is to be noted that the description is divided into the following items:

1. Overview of Processes Executed by Information Processing Apparatus According To Embodiment of Present Disclosure 2. Example of Configuration of Information Processing Apparatus According To Embodiment of Present Disclosure 3. Specific Example of Processes for Outputting Help Information for User 4. Example of Hardware Configuration of Information Processing Apparatus 1. Overview of Processes Executed by Information Processing Apparatus According to Embodiment of Present Disclosure First, the overview of processes executed by the information processing apparatus according to the embodiment of the present disclosure will be described with reference to FIG. 1. In FIG. 1, a television set is illustrated as an example of the information processing apparatus according to the embodiment of the present disclosure. An information processing apparatus 100 executes, for example, a process for displaying broadcast contents, as well as a process for playing back contents recorded on a built-in recording/playback device such as a hard disk, a digital versatile disc (DVD), or a Blu-ray disc, a process for recording programs on the recording/playback device, and the like.

There are a plurality of users in front of the information processing apparatus 100. In the example illustrated in FIG. 1, there are a user a 11, a user b 12, and a user c 13. These users make various requests to the information processing apparatus 100. The requests include, for example, switching of the channel, adjustment of the volume, start of a recording process, display of a list of recorded contents, selection and playback of a content from the list, stop of playback, and fast-forward.

The users a 11 to c 13 make these requests with speech, that is, with utterances. The information processing apparatus 100 includes a camera 101 and a speech input/output units 102 that have microphones and speakers. Words spoken by the users a 11 to c 13 are input to the information processing apparatus 100 through the speech input/output units 102 that have the microphone and the speakers. In addition, images of the users a 11 to c 13 are input to the information processing apparatus 100 through the camera 101.

The information processing apparatus 100 analyzes these pieces of input information, and then determines actions to be executed thereby and executes the actions. If the information processing apparatus 100 can understand a request made by a user, a process corresponding to the request is executed. The process may be, for example, switching of the channel, selection and playback of a content, or the like.

The information processing apparatus 100 analyzes, for example, the direction of the face of a user in past several steps, the direction the user looks at, the time elapsed after the previous utterance, the time elapsed since a system output the last response, actions of the system executed in response to speech commands made by a user in the past several steps, the current state of the system, and the like. In accordance with the results of the analyses, the information processing apparatus 100 estimates whether or not the user wants help from the system. If it has been estimated that the user is experiencing difficulties, help information is output by, for example, presenting an example of available commands or a command for displaying a help. Specific processes of this operation will be described later.

2. Example of Configuration of Information Processing Apparatus According To Embodiment of Present Disclosure Next, an example of the configuration of the information processing apparatus according to the embodiment of the present disclosure will be described with reference to FIG. 2. An information processing apparatus 100 illustrated in FIG. 2 corresponds to, for example, the information processing apparatus 100 illustrated in FIG. 1. It is to be noted that the information processing apparatus according to the embodiment of the present disclosure can be realized not only as a television set but also as a PC, a recording/playback device, or various other household electric appliances. That is, the information processing apparatus according to the embodiment of the present disclosure is an information processing apparatus that executes various processes in accordance with requests made by a user.

Figure 2:
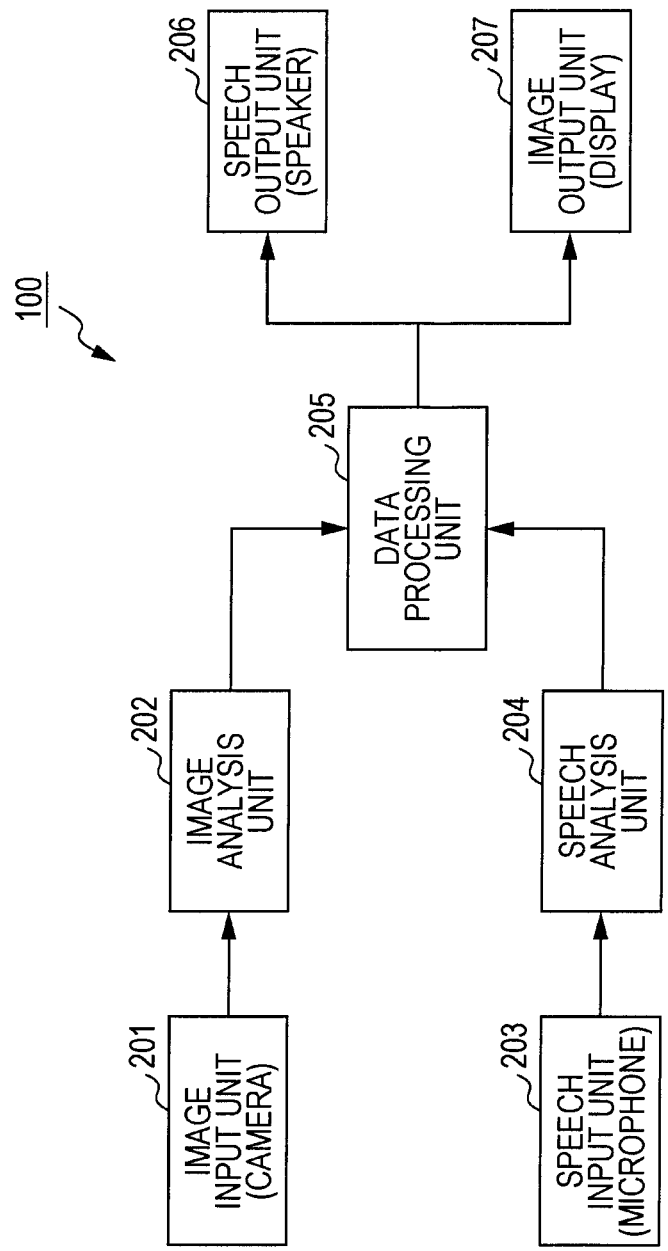
FIG. 2 is a block diagram illustrating an example of the configuration of the information processing apparatus according to the embodiment of the present disclosure.

As illustrated in FIG. 2, the information processing apparatus 100 includes an image input unit (camera) 201, an image analysis unit 202, a speech input unit (microphone) 203, a speech analysis unit 204, a data processing unit 205, a speech output unit (speaker) 206, and an image output unit (display) 207.

The image input unit (camera) 201 receives an image of the surroundings of the information processing apparatus 100, which is, for example, an image of a user. An image captured by the image input unit (camera) 201 is input to the image analysis unit 202. The image analysis unit 202 executes a process for identifying a user included in the captured image using, for example, registered information stored in a storage unit in advance, such as face information of the user. More specifically, information such as the position of a user, the identity of a user, and the like is analyzed. This analysis information is input to the data processing unit 205.

The speech input unit (microphone) 203 receives speech information around the information processing apparatus 100, which is, for example, an utterance of a user. Speech information received by the speech input unit (microphone) 203 is input to the speech analysis unit 204. The speech analysis unit 204 has a dictionary for speech analysis in a storage unit and analyzes a word spoken by a user using the dictionary, and then inputs analysis information to the data processing unit 205.

The data processing unit 205 receives speech analysis information from the speech analysis unit 204 and image analysis information from the image analysis unit 202. In accordance with the input information, the data processing unit 205 determines a process (action) to be executed by the information processing apparatus 100. That is, as described above, if the information processing apparatus 100 can understand a request made by a user, a process corresponding to the request is executed. The process may be, for example, switching of the channel or selection and playback of a content.

Furthermore, the data processing unit 205 analyzes, for example, the direction of the face of a user in past several steps, the direction the user looks at, the time elapsed after the previous utterance, the time elapsed since the system output the last response, actions of the system executed in response to speech commands made by a user in the past several steps, the current state of the system, and the like. In accordance with the results of the analyses, the data processing unit 205 estimates whether or not the user wants help from the system. If it has been estimated that the user is experiencing difficulties, help information is output by, for example, presenting an example of available commands or a command for displaying a help.

A process for outputting help information is executed either by the speech output unit (speaker) 206 as speech output or by the image output unit (display) 207 as image output, or by the combination of the two. Specific content of this operation will be described later.

Figure 3:
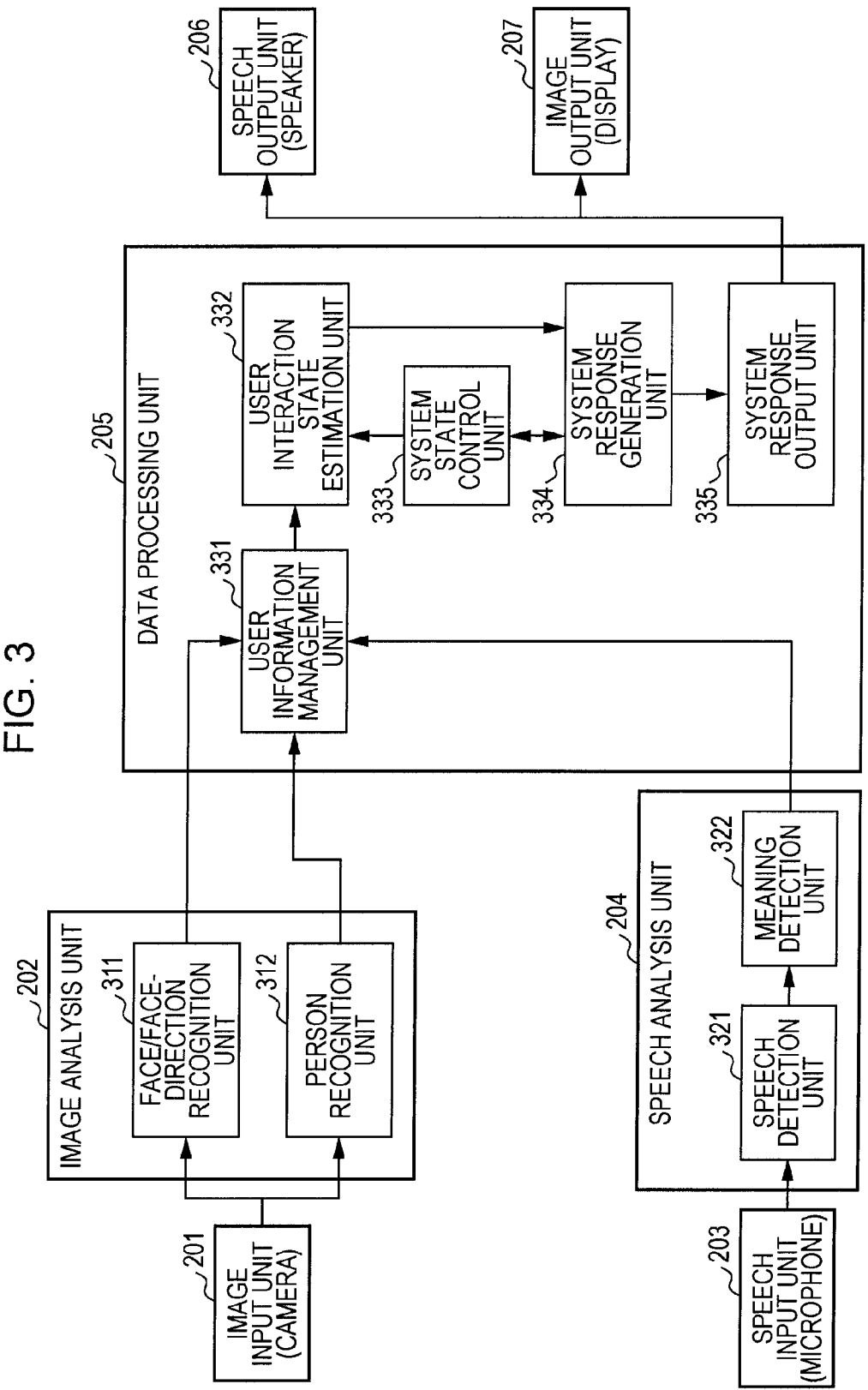
FIG. 3 is a block diagram illustrating an example of the detailed configuration of the information processing apparatus according to the embodiment of the present disclosure.

FIG. 3 is a diagram illustrating the detailed configuration of the information processing apparatus 100 illustrated in FIG. 2.

The image analysis unit 202 has a face/face-direction recognition unit 311 and a person recognition unit 312.

The speech analysis unit 204 has a speech detection unit 321 and a meaning detection unit 322.

The data processing unit 205 has a user information management unit 331, a user interaction state estimation unit 332, a system state control unit 333, a system response generation unit 334, and a system response output unit 335.

At each sampling time, which is provided at predetermined frame intervals, the face/face-direction recognition unit 311 and the person recognition unit 312 in the image analysis unit 202 judge whether or not there is a face or a person in a frame image on the basis of a captured image input from the image input unit (camera) 201. If it has been judged that there is a face or a person in a frame image, the face/face-direction recognition unit 311 and the person recognition unit 312, for example, estimate the attributes of the face (angle, estimated age, and gender of the face, and the like), analyze the direction of the face, and identify the face. Dictionary data and face image information that are necessary for this process are registered in a memory included in the image analysis unit 202. For example, a process such as a process for identifying a face is executed by executing a process for matching a face of a person recognized in an image input from the image input unit (camera) 201 to face image data registered in advance.

The speech detection unit 321 and the meaning detection unit 322 in the speech analysis unit 204, for example, estimate the direction of a speech source, detect voiced frames, identify the meaning, and provide the reliability on the basis of speech data input from the speech input unit (microphone) 203. The speech analysis unit 204 has a dictionary for speech analysis in a storage unit and analyzes a word spoken by a user using the dictionary, and then inputs analysis information to the data processing unit 205.

During a speech analysis process, a process for rejecting sounds other than speech and obtaining only human voice is executed. Furthermore, a process for extracting the meaning is executed on the basis of the obtained speech information. This process is executed on the basis of, for example, a process for matching the obtained speech information to the dictionary data stored in the speech analysis unit 204. During this process, in a case where, for example, there is no registered word that the obtained speech information matches, data of the obtained speech information is rejected as a meaningless utterance. Furthermore, the reliability of speech recognition is calculated. The reliability is calculated on the basis of, for example, a matching ratio in relation to the dictionary data stored in the speech analysis unit 204 or the like. An utterance that has been judged to have low reliability as a result of a comparison with a predetermined threshold value or the like is rejected.

As illustrated in FIG. 3, the data processing unit 205 has the user information management unit 331, the user interaction state estimation unit 332, the system state control unit 333, the system response generation unit 334, and the system response output unit 335.

The user information management unit 331 receives information output from the face/face-direction recognition unit 311 and the person recognition unit 312, such as whether or not a face is included in an image, and if a face is included in an image, information such as the results of an estimation of the attributes of the face (angle, estimated age, and gender of the face, and the like), the results of an analysis of the direction of the face, and the results of identification of the face. Furthermore, the user information management unit 331 receives information regarding the content of an utterance from the meaning detection unit 322 in the speech analysis unit 204. The user information management unit 331 stores and manages these pieces of input information as user management information. It is to be noted that these pieces of information are sequentially updated as time elapses, and the user information management unit 331 records and manages these pieces of information on a memory as user information corresponding to each sampling time (t, t+1, t+2, and so on).

The user information stored in the user information management unit 331 is provided to the user interaction state estimation unit 332.

The user interaction state estimation unit 332 execute, for example, the following processes:

Process A: A process for analyzing the direction of the face of a user, the direction the user looks at, the duration over which the face of the user faces a direction, and the like in a predetermined period of time (a certain period of sampling time) until the present time.

Process B: A process for analyzing the operation history (presence or absence of failure in detection of voiced frames and an utterance outside a domain) of the system (information processing apparatus 100) and the learning level of a user in a predetermined period of time (a certain period of sampling time) until the present time.

Process C: A process for estimating the probability (degree of difficulty) that a user is experiencing difficulties in accordance with the time elapsed since the system (information processing apparatus 100) output the last response to a user and for, if it has been judged that the user is experiencing difficulties, presenting optimal help information.

The system state control unit 333 obtains and stores the state transition of the inside of the system (information processing apparatus 100).

The system response generation unit 334 judges whether or not an utterance of a user has ambiguity and determines how to output a response of the system in accordance with the state of the user.

The system response output unit 335 outputs a response to a user such as help information. The response is output from the speech output unit (speaker) 206 or from the image output unit (display) 207.

3. Specific Example of Processes for Outputting Help Information for User

Next, as an example of the processes executed by the information processing apparatus according to the embodiment of the present disclosure, a specific example of processes for outputting help information for a user will be described.

As described above, a multimodal interface adopting speech recognition and image recognition are limited in terms of the processing capabilities of a speech recognition apparatus and an image recognition apparatus to be used, which undesirably limits the number of types of utterances and movements of a user that can be understood. As a result, a problem is caused in that there may be a case in which the intention of a user is not recognized by the system and accordingly a process corresponding to the intention of the user is not executed. An example of processes described below is an example of processes that solves such a problem. In this example of processes, whether or not the user is experiencing difficulties is analyzed and the degree of difficulty of the user is calculated, and then presentation of help information is executed in accordance with the calculated degree of difficulty.

As described above, the user interaction state estimation unit 332 in the data processing unit 205 executes the following processes:

Process A: A process for analyzing the direction of the face of a user, the direction the user looks at, the duration over which the face of the user faces a direction, and the like in a predetermined period of time (a certain period of sampling time) until the present time.

Process B: A process for analyzing the operation history (presence or absence of failure in detection of voiced frames and an utterance outside a domain) of the system (information processing apparatus 100) and the learning level of a user in a predetermined period of time (a certain period of sampling time) until the present time.

Process C: A process for estimating the probability (degree of difficulty) that a user is experiencing difficulties in accordance with the time elapsed since the system (information processing apparatus 100) output the last response to a user and for, if it has been judged that the user is experiencing difficulties, presenting optimal help information.

Figure 4:
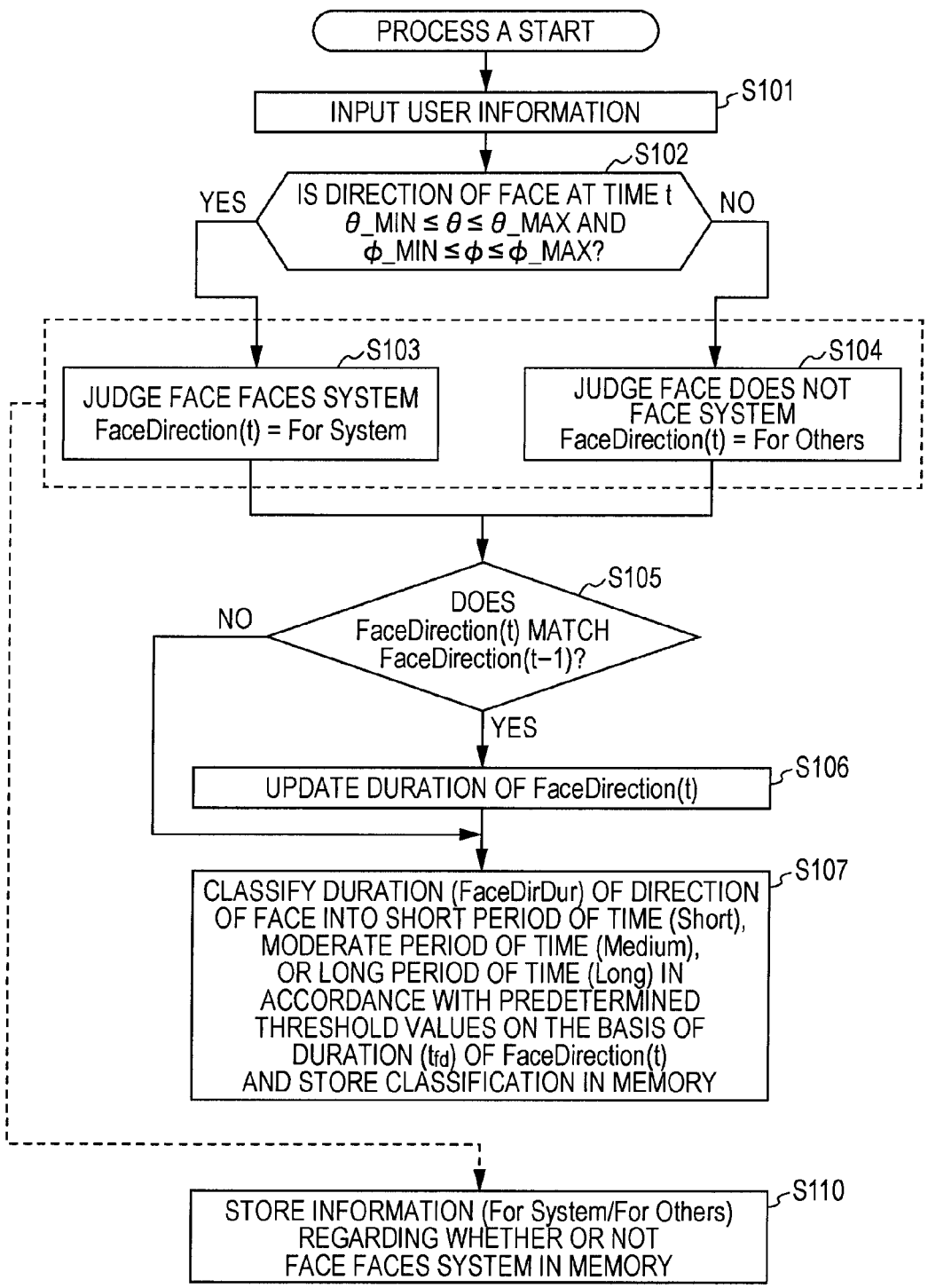
FIG. 4 is a flowchart illustrating an example of processes executed by the information processing apparatus according to the embodiment of the present disclosure.

Specific processing sequences of these Processes A to C will be described with reference to the flowcharts of FIG. 4 and the subsequent drawings.

First, the sequence of Process A will be described with reference to FIG. 4. Process A is the following process:

Process A: A process for analyzing the direction of the face of a user, the direction the user looks at, the duration over which the face of the user faces a direction, and the like in a predetermined period of time (a certain period of sampling time) until the present time.

In step S101, user information is input. The user information is information input to the user information management unit 331 from the image analysis unit 202 and the speech analysis unit 204. That is, the user information includes whether or not a face is included in an image, and if a face is included in an image, includes information such as the results of an estimation of the attributes of the face (angle, estimated age, and gender of the face, and the like), the results of an analysis of the direction of the face, the results of identification of the face, and information regarding the content of an utterance. It is to be noted that these pieces of information are sequentially updated as time elapses, and the user interaction state estimation unit 332 receives information corresponding to each sampling time (t, t+1, t+2, and so on) from the user information management unit 331.

In step S102, whether or not the face of a user at the time t faces the system (information processing apparatus 100) is judged in accordance with the user information input from the user information management unit 331.

The user interaction state estimation unit 332 in the data processing unit 205 has threshold values of angles in the horizontal direction ($\theta\_MIN$ and $\theta\_MAX$) and threshold values of angles in the vertical direction ($\phi\_MIN$ and $\phi\_MAX$) as threshold values for judging whether or not the face of a user faces the system (information processing apparatus 100). If the direction of the face of the user is within the range of these angles, the user is judged to face the system (information processing apparatus 100).

That is, in step S102, whether or not the direction ($\theta$, $\phi$) of the face at the time t satisfies conditions $\theta\_MIN \leq \theta \leq \theta\_MAX$ and $\phi\_MIN \leq \phi \leq \phi\_MAX$ is judged.

If the above conditions have been satisfied, it is judged that the face of the user faces the system (information processing apparatus 100), and accordingly step S102 is judged to be "YES" and the processing proceeds to step S103.

On the other hand, if the above conditions have not been satisfied, it is judged that the face of the user does not face the system (information processing apparatus 100), and accordingly step S102 is judged to be "NO" and the processing proceeds to step S104.

In step S103, it is judged that the face faces the system, and a parameter (FaceDirection(t)) that indicates the direction of the face of the user at the time t is set as follows:

FaceDirection(t)=For System

The above data is data that indicates that the direction of the face of the user at the time t is such that the face of the user faces the system.

On the other hand, in step S104, it is judged that the face does not face the system, and the parameter (FaceDirection(t)) that indicates the direction of the face of the user at the time t is set as follows:

FaceDirection(t)=For Others

The above data is data that indicates that the direction of the face of the user at the time t is such that the face of the user does not face the system.

The pieces of data set in steps S103 and S104 are stored in a memory as described in step S110. The stored pieces of data are stored as data corresponding to the time.

After the processes in steps S103 and S104, the processing proceeds to step S105.

In step S105, whether or not the direction of the face of the user at the time t (FaceDirection(t)) matches the direction of the face of the user at the previous sampling time t−1 (FaceDirection(t−1)) is judged. That is, whether or not the user continuously faces the same direction is judged.

If the direction of the face of the user at the time t (FaceDirection(t)) matches the direction of the face of the user at the previous sampling time t−1 (FaceDirection(t−1)), the processing proceeds to step S106, and the duration of the direction of the face of the user (FaceDirection(t)) is updated and stored in the memory.

If not, the process in step S106 is omitted.

Next, in step S107, the duration (FaceDirDur) of the direction of the face is classified into (1) a short period of time (short), (2) a moderate period of time (medium), or (3) a long period of time (long) in accordance with predetermined threshold values on the basis of the duration ($t_{fd}$) of the direction of the face of the user (FaceDirection(t)). The classification is stored in the memory.

Next, the sequence of Process B will be described with reference to the flowchart of FIG. 5. Process B is the following process:

Process B: A process for analyzing the operation history (presence or absence of failure in detection of voiced frames and an utterance outside a domain) of the system (information processing apparatus 100) and the learning level of a user in a predetermined period of time (a certain period of sampling time) until the present time.

In step S201, whether or not the system (information processing apparatus 100) has received an utterance of the user and executed a process is judged.

The judgment in this process is made on the basis of system processing information input to the user interaction state estimation unit 332 from the system state control unit 333.

If it has been judged in step S201 that the system (information processing apparatus 100) has received an utterance of the user and executed a process, the processing proceeds to step S202. If it has been judged that the system (information processing apparatus 100) has not executed a process, the processing proceeds to step S211.

When the system (information processing apparatus 100) has received an utterance of the user and executed a process, the processing proceeds to step S202. In step S202, the number of times that an utterance of the user has been rejected, that is, the number of times that a process has not been executed in accordance with utterances of the user, is stored in the memory as session information.

Next, in step S203, a feature quantity and predetermined threshold values regarding the number of times of rejection in past several sessions are compared. The "feature quantity" herein refers to, for example, information regarding the reasons of rejection and the like. The reasons of rejection include, for example, failure in detection of voiced frames, a judgment that an utterance has been made outside the domain, and the results of a speech analysis judged to have low reliability.

Next, in step S204, the user is classified into one of the following user levels (User Level) on the basis of the process for comparing the number of times of rejection, the feature quantity, and the predetermined threshold values: (a) beginner (Beginner), (b) trained (Trained), and (c) expert (Expert).

A "session" herein refers to, for example, a period of time until a process corresponding to an utterance of the user is estimated to have been executed.

If an utterance of the user is a request to change the channel, a "session" refers to a period of time until the system executes a correct channel change according to the request made by the user. When a plurality (for example, a number of times of n+1) of utterances have been made by the user during that period of time and a correct process for changing the channel is executed in response to an (n+1)th utterance, the number of times of rejection is n.

In step S204, the user is classified into one of the following user levels in accordance with the number of times of rejection and the predetermined threshold values: (a) a user who has caused a large number of times of rejection=beginner (Beginner), (b) a user who has caused a moderate number of times of rejection=trained (Trained), and (c) a user who has caused a small number of times of rejection=expert (Expert).

It is to be noted that a configuration in which the above level setting is changed depending on whether or not the feature quantity as the reason of rejection is the same may be adopted.

On the other hand, in step S201, if it has been judged that the system (information processing apparatus 100) has received an utterance of the user but has not executed a process, that is, if an utterance of the user is rejected, the processing proceeds to step S211.

In step S211, the number of times that an utterance of the user has been rejected, which is stored in the memory, is updated. It is to be noted that there are various factors involved in reasons why processes are not executed in response to utterances of the user, that is, why utterances of the user are rejected, such as failure in detection of voiced frames, an utterance made outside the domain, and the results of a speech analysis judged to have low reliability.

Next, in step S212, the number of times of rejection in the past several sessions have been rejected and the predetermined threshold values are compared.

Next, in step S213, error level is classified into the following levels on the basis of the process for comparing the number of times of rejection and the threshold values: (a) low (Low), (b) medium (Mid), and (c) high (High).

Next, a sequence (Process C-1) of the first half of Process C will be described with reference to the flowchart of FIG. 6. Process C is the following process:

Process C: A process for estimating the probability (degree of difficulty) that a user is experiencing difficulties in accordance with the time elapsed since the system (information processing apparatus 100) output the last response to a user and for, if it has been judged that the user is experiencing difficulties, presenting optimal help information.

Figure 6:
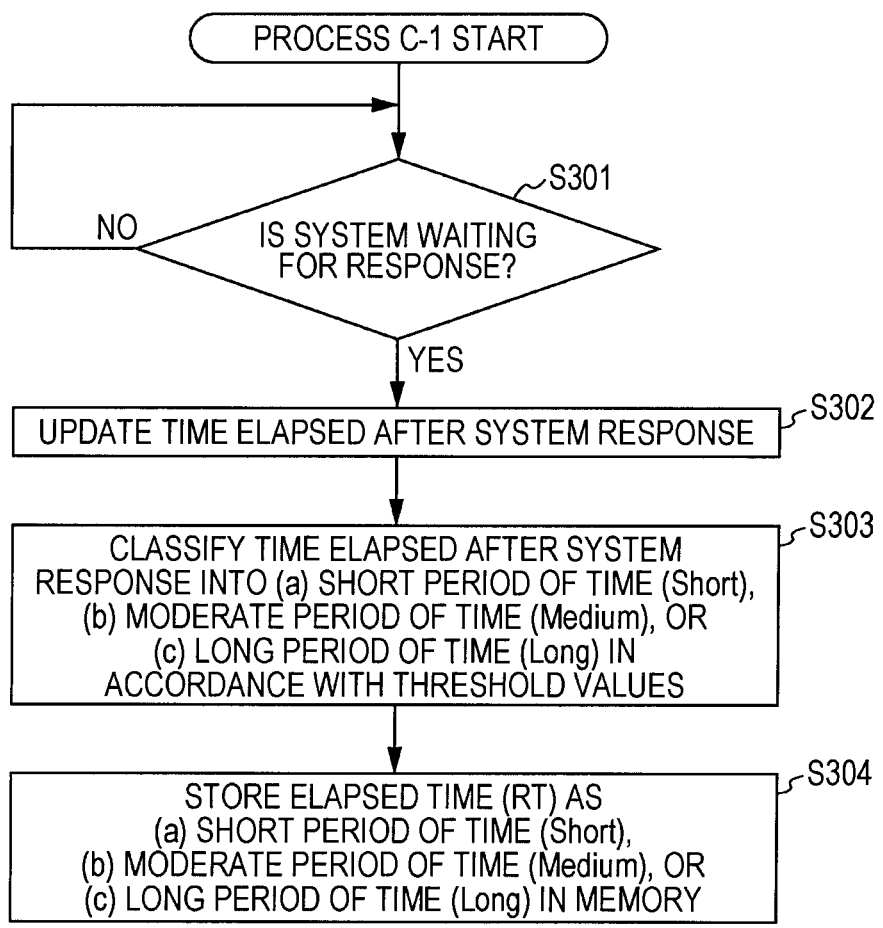
FIG. 6 is a flowchart illustrating an example of processes executed by the information processing apparatus according to the embodiment of the present disclosure.

The process illustrated in FIG. 6 is a process (Process C-1) performed in the first half of Process C and a process for calculating the time elapsed since the system (information processing apparatus 100) made the last response to the user.

In step S301, whether or not the system (information processing apparatus 100) is waiting for a response from the user is judged.

The judgment in this process is made on the basis of the system processing information input to the user interaction state estimation unit 332 from the system state control unit 333.

If it has been judged in step S301 that the system (information processing apparatus 100) is waiting for a response from the user, the processing proceeds to step S302.

In step S302, the time elapsed since the system executed a process for responding to the user is updated.

The system state control unit 333 records the time elapsed since the system executed the process for responding to the user and sequentially updates the data.

In step S303, the time elapsed since the system made the response is classified into (a) a short period of time (Short), (b) a moderate period of time (Medium), or (c) a long period of time (Long) in accordance with predetermined threshold values.

Next, in step S304, the elapsed time (RT) is stored in the memory as (a) a short period of time (Short), (b) a moderate period of time (Medium), or (c) a long period of time (Long).

The flowchart of FIG. 6 illustrates the process (Process C-1) performed in the first half of Process C.

A process (Process C-2) performed in the second half of Process C is a process for calculating the degree of difficulty of the user by using the results obtained from the above-described Processes A, B, and C-1, for determining whether or not help information is to be presented to the user in accordance with the calculated degree of difficulty, and for presenting the help information if it has been determined that the help information is to be presented.

This process will be described with reference to the flowchart of FIG. 7.

Figure 7:
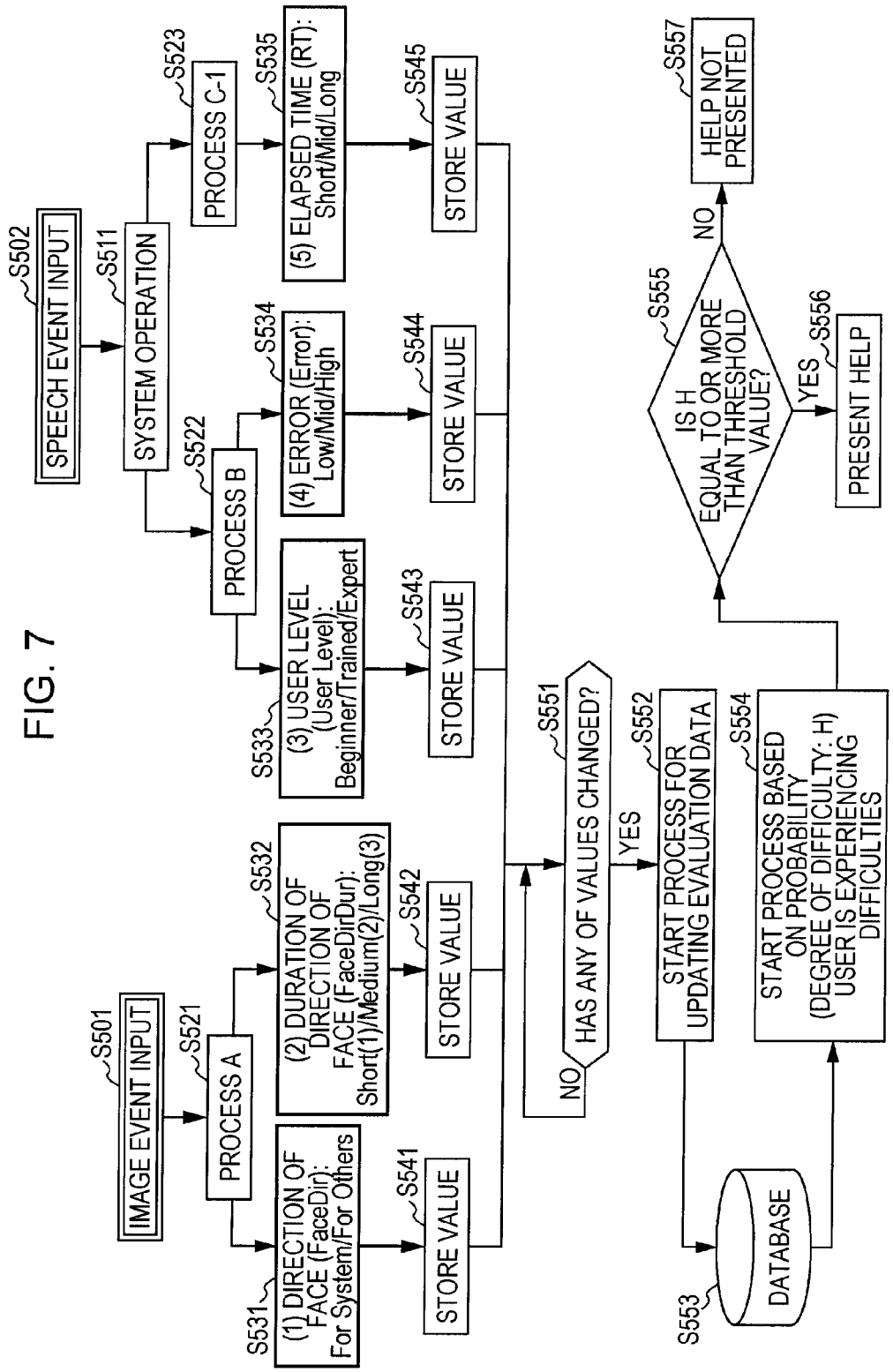
FIG. 7 is a flowchart illustrating an example of processes executed by the information processing apparatus according to the embodiment of the present disclosure.

In the flowchart of FIG. 7, processes from step S501 to step S545 correspond to the processes executed in the above-described Processes A, B, and C-1.

Processes in step S551 and the subsequent steps correspond to the process (Process C-2) performed in the second half of Process C.

Image event input in step S501 is a process for inputting the results of an analysis process executed by the image analysis unit 202 to the data processing unit 205 on the basis of image information input from the image input unit (camera) 201.

More specifically, for example, whether or not a face is included in an image, and if a face is included in an image, information such as the results of an estimation of the attributes of the face (angle, estimated age, and gender of the face, and the like), the results of an analysis of the direction of the face, and the results of identification of the face are input as the result of the analysis process executed by the image analysis unit 202.

Speech event input in step S502 is a process for inputting the results of an analysis process executed by the speech analysis unit 204 to the data processing unit 205 on the basis of speech information input from the speech input unit (microphone) 203. More specifically, for example, information regarding the content of an utterance or the like is input as a result of the analysis process executed by the speech analysis unit 204.

Process A in step S521 is the process that has been described with reference to the flowchart of FIG. 4.

That is, in step S521, the following process is executed:

Process A: A process for analyzing the direction of the face of a user, the direction the user looks at, the duration over which the face of the user faces a direction, and the like in a predetermined period of time (a certain period of sampling time) until the present time.

Processes for obtaining the results of the execution of Process A in step S521 and storing the results in the memory are executed in steps S531, S541, S532, and S542.

Processes in steps S531 and S541 are as follows.

In step S531, information (FaceDir) regarding the direction of the face at each sampling time (t, t+1, t+2, and so on), namely, (a) the face faces the system (information processing apparatus 100) (For System) or (b) the face does not face the system (information processing apparatus 100) (For Others), is obtained as a result of Process A.

The obtained information is stored in the memory in step S541.

Processes in steps S532 and S542 are as follows.

In step S532, information (FaceDirDur) regarding the duration of the direction of the face at each sampling time (t, t+1, t+2, and so on), namely, (a) the duration over which the face faces a particular direction is short (Short), (b) the duration over which the face faces a particular direction is moderate (Medium), or (c) the duration over which the face faces a particular direction is long (Long) is obtained as a result of Process A.

After the speech event input in step S502, the system operation in step S511 is executed, and then Process B in step S522 and Process C in step S523 are executed.

The speech event input in step S502 is, for example, an operation request to the system (information processing apparatus 100) made by the user. More specifically, the speech event input includes, for example, a channel change request.

The system operation in step S511 executed after the speech event input in step S502 is a process executed by the system (information processing apparatus 100) in response to a request made by the user. It is to be noted that the system operation might or might not be correctly executed in response to a request made by the user. In addition, an utterance of the user might be rejected due to, for example, failure in detection of voiced frames, an judgment that an utterance has been made outside the domain, or the results of a speech analysis judged to have low reliability. The system operation in step S511 includes all these operations.

Figure 5:
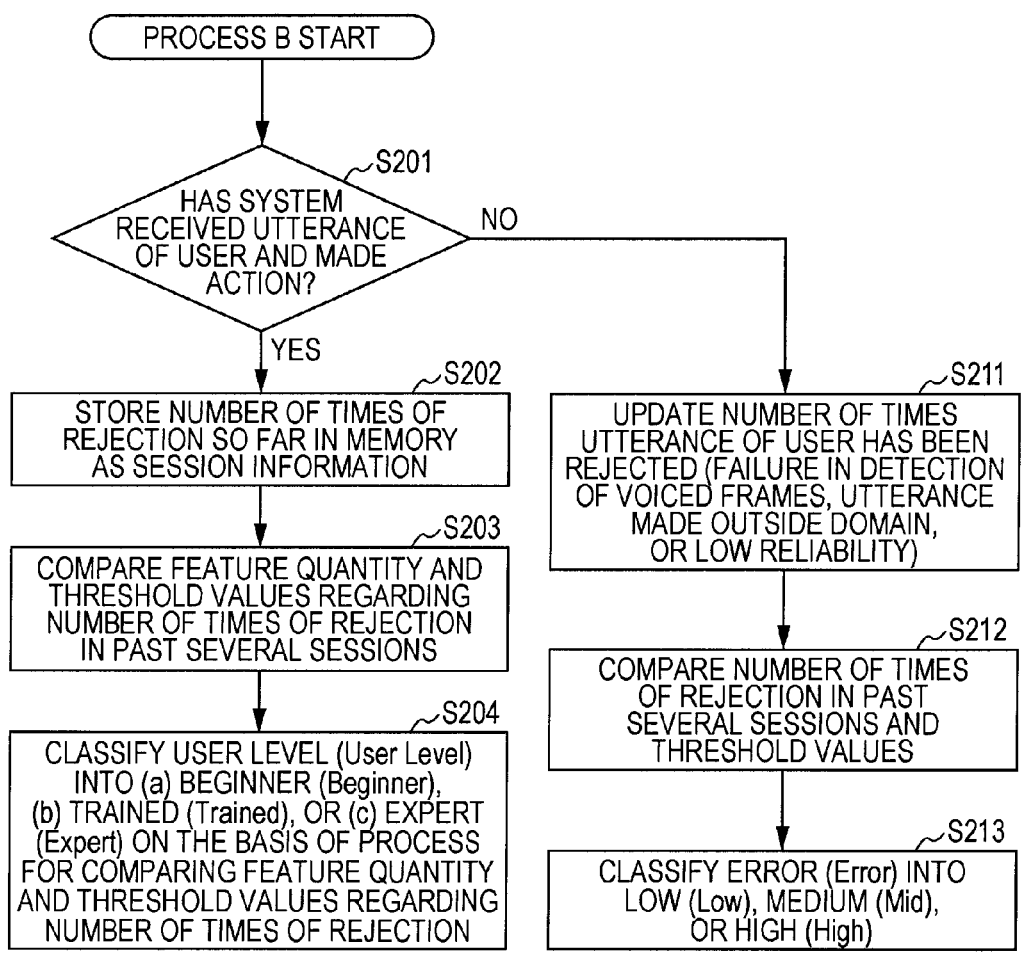
FIG. 5 is a flowchart illustrating an example of processes executed by the information processing apparatus according to the embodiment of the present disclosure.

After the system operation in step S511, Process B, which has been described with reference to the flowchart of FIG. 5, is executed in step S522 and Process C-1, which has been described with reference to the flowchart of FIG. 6, is executed in step S523.

Process B in step S522 is the process that has been described with reference to the flowchart of FIG. 5.

That is, in step S522, the following process is executed:

Process B: A process for analyzing the operation history (presence or absence of failure in detection of voiced frames and an utterance outside a domain) of the system (information processing apparatus 100) and the learning level of a user in a predetermined period of time (a certain period of sampling time) until the present time.

Processes for obtaining the results of the execution of Process B in step S522 and storing the results in the memory are executed in steps S533, S543, S534, and S544.

Processes in steps S533 and S543 are as follows.

In step S533, user level information (User Level), namely, (a) beginner (Beginner), (b) trained (Trained), or (c) expert (Expert) is obtained as a result of Process B.

The obtained information is stored in the memory in step S543. It is to be noted that the user level information, too, is recorded on the memory as information corresponding to each sampling time (t, t+1, t+2, and so on).

Processes in steps S534 and S544 are as follows.

In step S534, error level information (Error) such as (a) low (Low), (b) medium (Mid), or (c) high (High) is obtained as a result of Process B. It is to be noted that, as described with reference to the flowchart of FIG. 5, the error level information is obtained on the basis of the number of times that an utterance of the user has been rejected.

In step S544, the error level information is stored in the memory. It is to be noted that the error level information, too is recorded on the memory as information corresponding to each sampling time (t, t+1, t+2, and so on).

Furthermore, after the system operation in step S511, Process C-1, which has been described with reference to the flowchart of FIG. 6, is executed in step S523.

That is, the following process is executed:

Process C: A process for estimating the probability (degree of difficulty) that a user is experiencing difficulties in accordance with the time elapsed since the system (information processing apparatus 100) output the last response to a user and for, if it has been judged that the user is experiencing difficulties, presenting optimal help information.

A process executed in step S523 is the process (Process C-1) performed in the first half of Process C. A process for calculating the time elapsed since the system (information processing apparatus 100) made the last response to the user is executed.

Processes for obtaining the results of the execution of Process C in step S523 and storing the results in the memory are executed in steps S535 and S545.

Processes in steps S535 and S545 are as follows.

In step S535, as a result of Process C, any of the following pieces of information is obtained as information regarding elapsed time (RT), which is a result of the classifying, in accordance with the predetermined threshold values, the time elapsed since the system executed a process for responding to the user: (a) elapsed time (RT)=a short period of time (Short), (b) elapsed time (RT)=a moderate period of time (Medium), or (c) elapsed time (RT)=a long period of time (Long).

The obtained information is stored in the memory in step S545. It is to be noted that the information regarding the elapsed time (RT), too, is recorded in the memory as information corresponding to each sampling time (t, t+1, t+2, and so on).

The following information that has been obtained as the results of Processes A to C in steps S521 to S523 described above is recorded on the memory.

An example of data to be recorded on the memory is illustrated in FIG. 8. In FIG. 8, an example of obtained data corresponding to two consecutive points of sampling time t−1 and t for each of three users (U1 to U3) is illustrated.

For example, the values of (1) to (5) described below are recorded on the memory.

(1) Information regarding the direction of the face (FaceDir)

(1a) The face faces the system (information processing apparatus 100) (For System)=1

(1b) The face does not face the system (For Others)=2

(2) Information regarding the duration of the direction of the face (FaceDirDur)

(2a) The duration over which the face faces a particular direction is short (Short)=1

(2b) The duration over which the face faces a particular direction is moderate (Medium)=2

(2c) The duration over which the face faces a particular direction is long (Long)=3

(3) User level information (User Level)

(3a) Beginner (Beginner)=1

(3b) Trained (Trained)=2

(3c) Expert (Expert)=3

(4) Error level information (Error)

(4a) Low (Low)=1

(4b) Medium (Mid)=2

(4c) High (High)=3

(5) Information regarding the time elapsed (RT) after the system has executed a process for making a response (5a) Elapsed time (RT)=A short period of time (Short) =1

(5b) Elapsed time (RT)=A moderate period of time (Medium)=2

(5c) Elapsed time (RT)=A long period of time (Long)=3

Thus, the above pieces of information (1) to (5) obtained as the results of Processes A to C in steps S521 to S523 are recorded on the memory in steps S541 to S545.

Processes in step S551 and the subsequent steps correspond to the process (Process C-2) performed in the second half of Process C.

As described above, Process C is the following process:

Process C: A process for estimating the probability (degree of difficulty) that a user is experiencing difficulties in accordance with the time elapsed since the system (information processing apparatus 100) output the last response to a user and for, if it has been judged that the user is experiencing difficulties, presenting optimal help information.

The processes that are executed in step S551 and the subsequent steps are the process (Process C-2) performed in the second half of Process C, and a process for estimating the probability (degree of difficulty) that the user is experiencing difficulties and, if it has been judged that the user is experiencing difficulties, for presenting optimal help information.

Details of the processes in step S551 and the subsequent steps will be described hereinafter.

In step S551, whether or not the values that have been stored in the memory in steps S541 to S545 have changed is judged. As described above, the above pieces of information (1) to (5) that are obtained as the results of Processes A to C in steps S521 to S523 are obtained at each predetermined sampling time (t, t+1, t+2, and so on) and stored in the memory as data corresponding to the time. More specifically, the data corresponding to the time that has been described with reference to FIG. 8 is sequentially recorded on the memory.

In step S551, whether or not there is a difference between obtained data at the last sampling time and obtained data at the previous sampling time, which are recorded on the memory, is judged.

If it has been judged that there is a change in any of the above pieces of data (1) to (5) by comparing the data at the last sampling time and that at the previous sampling time, which are recorded on the memory, processes in step S552 and the subsequent steps are executed.

In step S552, a process for calculating an evaluation value on the basis of the latest pieces of obtained data is begun. More specifically, the evaluation value herein is the degree of difficulty (H) that indicates how much difficulty the user is experiencing. A process for calculating the degree of difficulty (H) is begun.

More specifically, the degree of difficulty (H) is calculated by using a predetermined function and each value of the above-described pieces of information stored in the memory, namely, (1) information regarding the direction of the face (FaceDir)=1 or 2, (2) information regarding the duration of the direction of the face (FaceDirDur)=1, 2, or 3, (3) user level information (User Level)=1, 2, or 3, (4) error level information (Error)=1, 2, or 3, and (5) information regarding the time elapsed (RT) since the system has executed a process for making a response=1, 2, or 3.

More specifically, the degree of difficulty (H) is calculated, for example, by using the following function:

$$H=p(\text{value of (1)})+q(\text{value of (2)})+r(\text{value of (3)})+s(\text{value of (4)})+t(\text{value of (5)})$$

It is to be noted that p, q, r, s, and t are predetermined coefficients.

The degree of difficulty (H) of the user is calculated in accordance with the above expression by using the pieces of information (1) to (5).

The degree of difficulty (H) calculated in step S552 is stored in the memory (database) in step S553. The pieces of data illustrated on the right end of FIG. 8 are the degrees of difficulty (H).

The degree of difficulty (H) is calculated, for example, in the range of 0 to 100. Larger values indicate that the probability that the user is experiencing difficulties is higher.

In step S554, a process based on a latest updated value of the degree of difficulty (H) that is newly calculated is begun.

In step S555, the updated degree of difficulty (H) and a predetermined threshold value (TH) are compared.

If it has been judged in step S555 that an expression for judgment "the degree of difficulty (H)≥TH" is satisfied, the processing proceeds to step S556, and help information is output from the audio output unit (speaker) 206 or the image output unit (display) 207. It is to be noted that the help information to be presented is changed in accordance with the state of the system (information processing apparatus 100).

On the other hand, if it has been judged in step S555 that the above expression for judgment is not satisfied, the processing proceeds to step S557, and help information is not output.

An example of the help information presented to the user in step S556 is illustrated in FIG. 9.

As described above, the help information to be presented is changed in accordance with the state of the system (information processing apparatus 100). The system state is monitored by the system state control unit 333 illustrated in FIG. 3.

As illustrated in FIG. 9, when the system state is, for example, "display of recommended programs", help information such as "Please select a program you want to watch from the recommended programs, or search for a program using search keywords" is presented to the user from the audio output unit (speaker) 206 or the image output unit (display) 207.

In addition, when the system state is "display of the specified channel or day", help information such as "You can refine your search with titles or genres such as drama, sport, variety, music, and movies" is presented to the user from the audio output unit (speaker) 206 or the image output unit (display) 207.

In addition, when the system state is "display of the specified genre", help information such as "You can refine your search with titles, channels, or the like" is presented to the user from the audio output unit (speaker) 206 or the image output unit (display) 207.

The processes in step S552 and the subsequent steps are sequentially executed when a value stored in the memory has been changed in step S551. Therefore, the information processing apparatus 100 can recognize the latest degree of difficulty (H) of the user according to the time and accordingly can present help information to the user at an optimal time in accordance with the latest degree of difficulty (H).

Thus, the information processing apparatus 100 according to the embodiment of the present disclosure calculates the degree of difficulty (H) of a user by using the predetermined function and each value of the following pieces of information that have been obtained in the above-described Processes A to C and that have been stored in the memory: (1) information regarding the direction of the face (FaceDir)=1 or 2, (2) information regarding the duration of the direction of the face (FaceDirDur)=1, 2, or 3, (3) user level information (User Level)=1, 2, or 3, (4) error level information (Error)=1, 2, or 3, and (5) information regarding the time elapsed (RT) since the system has executed a process for making a response=1, 2, or 3. The information processing apparatus 100 then provides the user with help information according to the calculated degree of difficulty (H) and the system state.

A specific example of a process for obtaining the state of the user, a process for calculating the degree of difficulty (H), and a process for presenting help information will be described.

Specific Example 1

For example, when there is no response from a user even if the user faces the front of the system and is paying attention to the system, it is judged that the user is experiencing difficulties or is being bothered because the user does not know a command to speak, and help information (hint) such as "Please select a program you want to watch from the recommended programs, or search for a program using search keywords" is presented.

User state information in this case is, for example, the following pieces of information:

(1) Information regarding the direction of the face (FaceDir)=The face faces the system (information processing apparatus 100) (For System)=1

(2) Information regarding the duration of the direction of the face (FaceDirDur)=The duration over which the face faces a particular direction is long (Long)=3

(3) User level information (User Level)=Beginner (Beginner)=1

(4) Error level information (Error)=Low (Low)=1

(5) Information regarding the time elapsed (RT) since the system has executed a process for making a response=A long period of time (Long)=3

The degree of difficulty (H) is calculated by using theses values and the following function:

$H=p(\text{value of }(1))+q(\text{value of }(2))+r(\text{value of }(3))+s(\text{value of }(4))+t(\text{value of }(5))$ For example, in accordance with the above expression for calculating the degree of difficulty (H), a value such as "the degree of difficulty (H)=80" is calculated. If the predetermined threshold value is assumed to be 20, since the degree of difficulty (H) of 80≥20, help information such as that described above is presented to the user.

Specific Example 2

When a user is not paying attention to the system and the system is waiting for a response from the user, the system executes help output by, for example, presenting available commands to the user or by informing the user of a temporary stop or termination of the operation of the system that will be executed several minutes later. More specifically, help information (hint) such as "Please search for a program you want to watch, or refine your search with genres" is presented.

The user state information in this case is, for example, the following pieces of information:

(1) Information regarding the direction of the face (FaceDir)=The face does not face the system (For Others)=2

(2) Information regarding the duration of the direction of the face (FaceDirDur)=The duration over which the face faces a particular direction is moderate (Medium)=2

(3) User level information (User Level)=Trained (Trained)=2

(4) Error level information (Error)=Low (Low)=1

(5) Information regarding the time elapsed (RT) since the system has executed a process for making a response=A long period of time (Long)=3

The degree of difficulty (H) is calculated by using theses values and the following function:

$H=p(\text{value of }(1))+q(\text{value of }(2))+r(\text{value of }(3))+s(\text{value of }(4))+t(\text{value of }(5))$ For example, in accordance with the above expression for calculating the degree of difficulty (H), a value such as "the degree of difficulty (H)=20" is calculated. If the predetermined threshold value is assumed to be 20, since the degree of difficulty (H) of 20≥20, help information such as that described above is presented to the user.

Specific Example 3

If there have been several consecutive events in which an action of the system is not generated due to failure in detection of voiced frames, failure in understanding of the meaning (an utterance made outside the domain), or the like even when a user repeatedly makes utterances to the system, help information (hint) such as "Available commands will be displayed on the guide window" is presented to the user.

The user state information in this case is, for example, the following pieces of information:

(1) Information regarding the direction of the face (FaceDir)=The face faces the system (information processing apparatus 100) (For System)=1

(2) Information regarding the duration of the direction of the face (FaceDirDur)=The duration over which the face faces a particular direction is long (Long)=3

(3) User level information (User Level)=Beginner (Beginner)=1

(4) Error level information (Error)=High (High)=3

(5) Information regarding the time elapsed (RT) since the system has executed a process for making a response=A short period of time (Short)=1

The degree of difficulty (H) is calculated by using theses values and the following function:

$H=p(\text{value of }(1))+q(\text{value of }(2))+r(\text{value of }(3))+s(\text{value of }(4))+t(\text{value of }(5))$ For example, in accordance with the above expression for calculating the degree of difficulty (H), a value such as "the degree of difficulty (H)=90" is calculated. If the predetermined threshold value is assumed to be 20, since the degree of difficulty (H) of 90≥20, help information such as that described above is presented to the user.

4. Example of Hardware Configuration of Information Processing Apparatus

Finally, the hardware configuration of the information processing apparatus 100 that executes the above-described processes will be described with reference to FIG. 10. A central processing unit (CPU) 701 executes various processes in accordance with programs stored in a read-only memory (ROM) 702 or a storage unit 708.

For example, processes of the speech analysis unit 204, the image analysis unit 202, and the data processing unit 205 in the configuration of the information processing apparatus 100 illustrated in FIG. 2 are executed. Programs executed by the CPU 701, data, and the like are stored in a random-access memory (RAM) 703 as necessary. The CPU 701, the ROM 702, and the RAM 703 are connected to one another by a bus 704.

The CPU 701 is connected to an input/output interface 705 through the bus 704. An input unit 706 that includes a camera, a microphone, a remote control, a keyboard, and a mouse and an output unit 707 that includes a display and a speaker are connected to the input/output interface 705. The CPU 701 executes various processes corresponding to information input from the input unit 706, and outputs the results of the processes to, for example, the output unit 707.

The storage unit 708 connected to the input/output interface 705 is formed of, for example, hardware, and stores the programs executed by the CPU 701 and various pieces of data.

Furthermore, various pieces of speech information and dictionary data that are necessary for the speech recognition process, user image data that is necessary for the user recognition process, and the like are recorded. A communication unit 709 communicates with an external apparatus through a network such as the Internet or a local area network (LAN).

A drive 710 connected to the input/output interface 705 drives a removable medium 711 such as a magnetic disk, an optical disk, a magneto-optical disk, or a semiconductor memory in order to obtain recorded programs and data. The obtained programs and data are transmitted to the storage unit 708 as necessary and stored.

The present technology has been described in detail with reference to the particular embodiments. However, it is obvious that one skilled in the art could modify and alter these embodiments without deviating from the scope of the present disclosure. That is, the present technology has been disclosed in the form of examples, and therefore the above description should not be interpreted to limit the present technology. In order to assess the scope of the present disclosure, the claims are to be referred to.

In addition, the series of processes described herein may be executed by hardware or software, or by a configuration obtained from a combination of the two. When the processes are executed by software, the processes may be executed by installing a program on which a processing sequence is recorded in a memory inside a computer incorporated in dedicated hardware, or by installing the program in a general purpose computer that can execute various processes. For example, the program may be recorded in a recording medium in advance. As well as being installed in a computer from a recording medium, the program may be received through a network such as a LAN or the Internet and installed in a built-in recording medium such as a hard disk.

It is to be understood that the various processes described herein may not only be chronologically executed in accordance with the order of description but also be executed in parallel with one another or individually in accordance with the processing capabilities of an apparatus that executes the processes or as necessary. In addition, the "system" herein refers to a logical configuration including a set of a plurality of apparatuses, and therefore is not limited to one in which the apparatuses having respective configurations are provided in the same case.

The present disclosure contains subject matter related to that disclosed in Japanese Priority Patent Application JP 2010-127110 filed in the Japan Patent Office on Jun. 2, 2010, the entire contents of which are hereby incorporated by reference.

What is claimed is:

1. An information processing electronic device configured to:
   execute a first process for analyzing an image captured by a camera and for determining whether the image contains a face;
   execute a second process for analyzing speech input from a microphone;
   receive a result of the first process and a result of the second process and execute output control of help information for a user;
   judge a duration over which a face of the user faces a particular direction on the basis of the result of the first process, if the image is determined to contain a face;
   determine a number of times the information processing electronic device rejects execution of a process, corresponding to the speech input, in response to the speech input made by the user;
   determine a user level of the user based on the number of times the information processing electronic device rejects the execution of the process corresponding to the speech input, a feature quantity and a predetermined threshold value for the number of times of rejecting the execution of the process, wherein the feature quantity represents information regarding reasons for rejecting the execution of the process; and
   calculate a degree of difficulty of the user by using information regarding the judgment, the number of times and the determined user level, and if the degree of difficulty that has been calculated is equal to or more than a predetermined threshold value, execute a process for outputting the help information to the user.

2. The information processing electronic device according to claim 1, further configured to:
   determine whether or not a face of the user faces the information processing electronic device on the basis of the result of the first process and calculate the degree of difficulty by using information regarding the determination.

3. The information processing electronic device according to claim 1, further configured to:
   calculate the degree of difficulty by using information regarding a judgment as to whether or not a process corresponding to a request made by the user has been executed.

4. The information processing electronic device according to claim 1, further configured to:
   calculate the degree of difficulty on the basis of information regarding a time elapsed since the information processing electronic device executed a process for responding to the user.

5. The information processing electronic device according to claim 1, further configured to:
   obtain and store state transition of the information processing electronic device; and
   execute a process for outputting help information corresponding to a stored system state.

6. The information processing electronic device of claim 1, wherein the first process comprises the information processing electronic device being configured to:
   responsive to determining the image contains a face:
   determine whether the face contained in the image is a face of the user;
   estimate an angle of the face with respect to the information processing electronic device; and
   responsive to determining that the face contained in the image is a face of the user, determine that the face of the user faces the particular direction based on the estimated angle.

7. The information processing electronic device according to claim 1, wherein the number of times the information processing electronic device rejects the execution of the process corresponding to the speech input is determined for a session, and wherein the session refers to a period of time until the information processing electronic device executes the process corresponding to the speech input.

8. The information procession electronic device according to claim 1, wherein the reason for rejecting the execution of the process includes at least one of: a failure in detection of voiced frames, a judgment that an utterance has been made outside a domain, and results of speech analysis judged to have low reliability.

9. The information processing electronic device according to claim 1, further configured to determine a learning level of the user in a predetermined period of time until a present time.

10. The information processing electronic device according to claim 1, further configured to match a direction of the face of the user at a first instance with the direction of the face of the user at a second instance, wherein the second instance is before the first instance.

11. The information processing electronic device according to claim 1, further configured to compare the duration over which the face of the user faces the particular direction with a predetermined threshold time to determine the degree of difficulty of the user.

12. An information processing method that is used in an information processing apparatus, the information processing method comprising:

executing, with an image analysis unit, a process for analyzing an image captured by a camera;

executing, with a speech analysis unit, a process for analyzing speech input from a microphone; and receiving, with a data processing unit, a result of the analysis conducted by the image analysis unit and a result of the analysis conducted by the speech analysis unit and executing output control of help information for a user, wherein, in the receiving, a degree of difficulty of the user is calculated based on:

a duration over which a face of the user faces a particular direction, if the image is determined to contain a face, the duration being determined based on the result of the image analysis, a number of times the information processing apparatus rejects execution of a process, corresponding to the speech input, in response to the speech input made by the user, and a user level of the user determined based on the number of times the information processing electronic device rejects the execution of the process corresponding to the speech input, a feature quantity and a predetermined threshold value for the number of times of rejecting the execution of the process, wherein the feature quantity represents information regarding reasons for rejecting the execution of the process, and if the degree of difficulty that has been calculated is equal to or more than a predetermined threshold value, a process for outputting the help information to the user is executed.

13. A non-transitory computer-readable medium comprising instructions that, when executed by an information processing apparatus, cause the information processing apparatus to:

cause an image analysis unit to execute a process for analyzing an image captured by a camera;

cause a speech analysis unit to execute a process for analyzing speech input from a microphone; and cause a data processing unit to receive a result of the analysis conducted by the image analysis unit and a result of the analysis conducted by the speech analysis unit and to execute output control of help information to a user, wherein, in the causing of the data processing unit to receive the result, a degree of difficulty of the user is calculated based on:

a duration over which a face of the user faces a particular direction, if the image is determined to contain a face, the duration being determined based on the result of the image analysis, a number of times the information processing apparatus rejects execution of a process, corresponding to the speech input, in response to the speech input made by the user, and a user level of the user determined based on the number of times the information processing electronic device rejects the execution of the process corresponding to the speech input, a feature quantity and a predetermined threshold value for the number of times of rejecting the execution of the process, wherein the feature quantity represents information regarding reasons for rejecting the execution of the process, and if the degree of difficulty that has been calculated is equal to or more than a predetermined threshold value, a process for outputting the help information to the user is executed.

* * * * *